(12) United States Patent
Leviton

(10) Patent No.: US 6,765,195 B1
(45) Date of Patent: Jul. 20, 2004

(54) METHOD AND APPARATUS FOR TWO-DIMENSIONAL ABSOLUTE OPTICAL ENCODING

(75) Inventor: Douglas B. Leviton, Dunkirk, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/154,392

(22) Filed: May 22, 2002

Related U.S. Application Data

(60) Provisional application No. 60/292,327, filed on May 22, 2001.

(51) Int. Cl.[7] .................................................. G01D 5/34
(52) U.S. Cl. .................... 250/231.13; 250/566; 356/617
(58) Field of Search ........................ 250/231.13, 231.14, 250/231.18, 237 G, 237 R, 566, 568–570; 356/616–617, 614; 341/9, 13; 33/706–707

(56) References Cited

U.S. PATENT DOCUMENTS

| | | | |
|---|---|---|---|
| 4,870,559 A | * | 9/1989 | Hyatt ............................ 700/1 |
| 5,642,297 A | * | 6/1997 | Brady et al. ................. 702/152 |
| 5,965,879 A | | 10/1999 | Leviton |
| 6,246,050 B1 | | 6/2001 | Tullis et al. |

FOREIGN PATENT DOCUMENTS

JP          11-248489          * 9/1999

OTHER PUBLICATIONS

Translation of a part of a foreign patent document, JP 11–248489, Inventor Ahimokawabe, which was cited by the Examiner.

* cited by examiner

*Primary Examiner*—Thanh X. Luu
*Assistant Examiner*—Seung C Sohn
(74) *Attorney, Agent, or Firm*—Chan K. Park

(57) ABSTRACT

This invention presents a two-dimensional absolute optical encoder and a method for determining position of an object in accordance with information from the encoder. The encoder of the present invention comprises a scale having a pattern being predetermined to indicate an absolute location on the scale, means for illuminating the scale, means for forming an image of the pattern; and detector means for outputting signals derived from the portion of the image of the pattern which lies within a field of view of the detector means, the field of view defining an image reference coordinate system, and analyzing means, receiving the signals from the detector means, for determining the absolute location of the object. There are two types of scale patterns presented in this invention: grid type and starfield type.

26 Claims, 7 Drawing Sheets

METHOD AND APPARATUS FOR TWO-DIMENSIONAL ABSOLUTE OPTICAL ENCODING

CROSS-REFERENCES TO RELATED APPLICATIONS

This application now formalizes and incorporates herein by reference Provisional Application Serial No. 60/292,327, "Absolute Cartesian Encoder"Douglas B. Leviton et al., filed on May 22, 2001. Applicant claims the priority date thereof under 35 U.S.C. 119(e).

ORIGIN OF THE INVENTION

The invention described herein was made by employees of the United States Government. The invention may be manufactured and used by or for the governmental purposes without the payment of royalties thereon or therefor.

TECHNICAL FIELD

The invention is directed to a method and apparatus for, determining two-dimensional absolute position through optical encoding.

BACKGROUND ART

A two-dimensional optical encoder measures a two-dimensional position of an object by optically detecting marks on a scale attached to the object which moves with the object. Ordinarily, when two axes of encoding are required in an application, two linear encoders, disposed orthogonal to each other, are deployed, one along each axis. However, measurement errors can occur if the travel axes are not straight, flat, or orthogonal. Measurement error can also occur if the linear encoders are not aligned properly to their directions of motion. In this case, measured travel is always less than actual travel. In the case where an axis does not travel straight, such that with the intended motion there is also movement orthogonal to the intended motion, the encoder along the orthogonal axis will not sense that movement, resulting in error in position measurement. Therefore, the measurements can be of limited accuracy due to lack of orthogonality of mechanical alignment of axes, non-straight travels in two orthogonal axes, and mechanically coupled motions from two orthogonal axes.

If the encoders are of the incremental type each of the encoders simply measures translation by counting the number of marks that move past the encoder's optical detector. In a common form of such an encoder per axis, a fixed scale and a moving scale, which have identical transparent markings on opaque backgrounds, are interposed between a light source and the detector. The relative locations of the transparent markings determine the amount of light which is allowed to be transmitted through each marking, e.g., full transmission, ½ or ¼ transmission, or none at all. Of course, such an encoder can measure only relative displacement with respect to a reference position—not absolute position.

In a conventional absolute encoder, each position is given not simply by just one mark, but by a unique code pattern of marks which identifies the absolute position. A change in position is sensed by detecting a change in the code bits which make up the code pattern.

In a conventional absolute encoder such as the one just described, sensitivity is limited to the size of the smallest code bit which can be recorded, which is in turn limited by physical optics to about the wavelength of the light used to record and detect the code patterns. Thus, the best sensitivity available from such an absolute encoder is somewhat less than 1 micrometer ($\mu$m) of translation. Also, such an encoder is limited in the amount of travel that it can accommodate. For instance, such an encoder which uses 12-bit code patterns can encode up to $2^{12}$=4,096 positions. With a sensitivity of just under 1 micrometer ($\mu$m), the maximum travel which can be detected is around 4,000 micrometer ($\mu$m), or four millimeters. Moreover, because the code bits themselves are detected, damage to the scale can result in dead spots in which derived position information is anomalous.

SUMMARY OF THE INVENTION

The encoder of the present invention has a scale having a pattern formed thereon, the pattern being predetermined to indicate an absolute location on the scale, means for illuminating the scale, means for forming an image of the pattern; and detector means for outputting signals derived from the portion of the image of the pattern which lies within a field of view of the detector means, the field of view defining an image reference coordinate system, and analyzing means, receiving the signals from the detector means, for determining the absolute location of the object. There are two types of scale patterns presented in this invention: Cartesian grid type and starfield type, although other types such as skew and polar are also practical.

The invention is further directed to a method of determining a two-dimensional absolute position of an object for both grid type and starfield type patterns. In general, the method comprises: (a) providing a scale having a pattern formed thereon, the pattern being predetermined to indicate an absolute two-dimensional location on the scale; (b) relating motion between the scale and the object; (c) forming an image of the pattern which lies within a field of view of the detector means; and (d) determining a two-dimensional absolute location on the scale in accordance with the image.

The encoder and method according to the present invention use mature technologies such as microlithography, optical projection, CCD array image detection, and simple computational image processing. However, the specific use of a combination of such mature technologies according to the present invention allows results, such as those stated above, which were not possible through the use of heretofore known encoders.

BRIEF DESCRIPTION OF THE DRAWINGS

The preferred embodiments of the invention will now be described in detail with reference to the figures, in which.

DETAILED DESCRIPTION OF PREFERRED EMBODIES OF THE INVENTION

This invention presents a two-dimensional absolute optical encoder and a method for determining position of an object in accordance with information from the encoder. Example of a two-dimensional coordinate system is a Cartesian coordinate system, which has two orthogonal axes: X and Y. Another example of a two-dimensional coordinate system is a skew coordinate system which has two non-orthogonal axes. Another example of a two-dimensional coordinate system is a polar coordinate system which has one radial coordinate axis and one angular coordinate axis.

Figure 1:
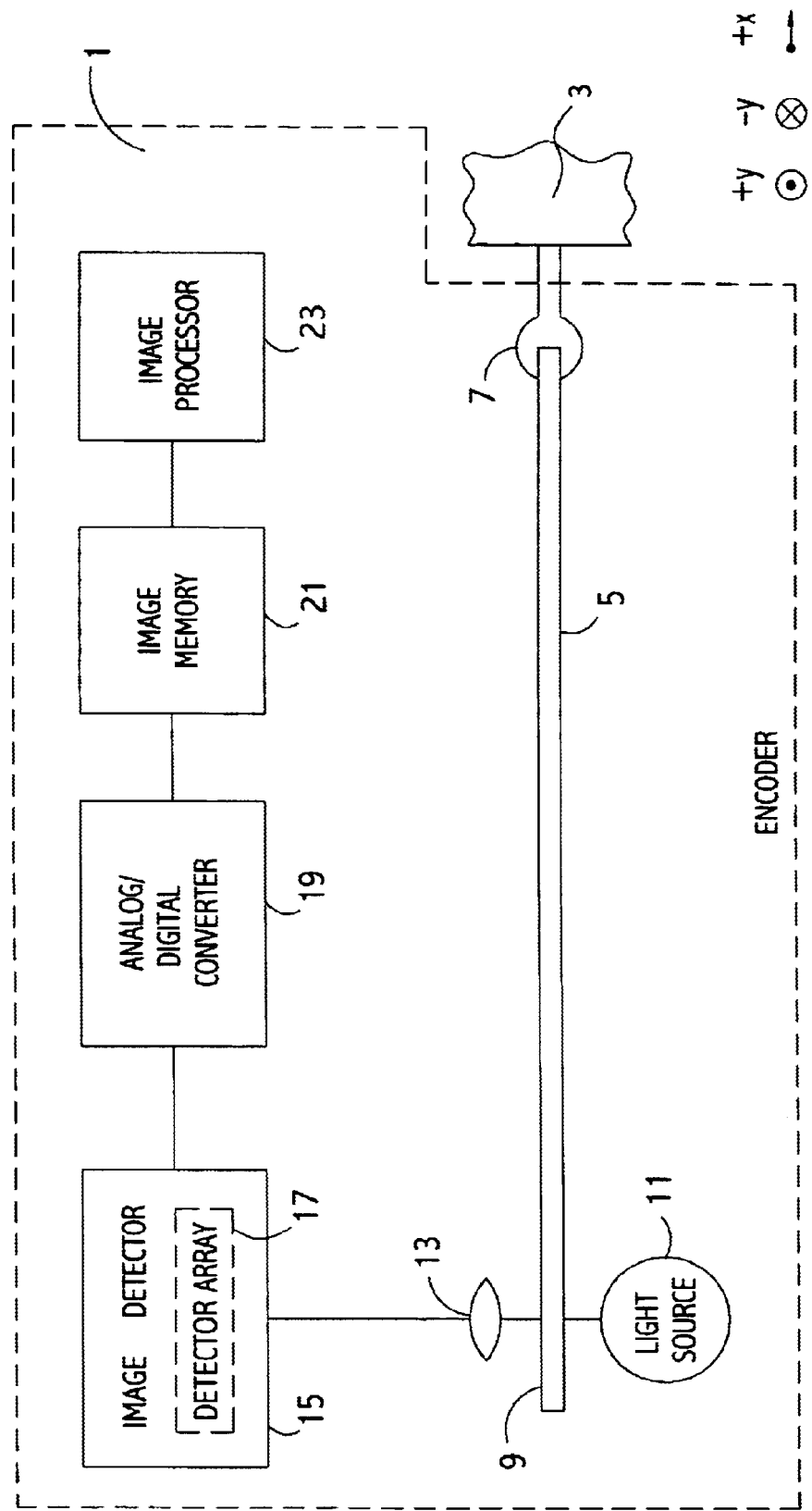
FIG. 1-a shows a block diagram of another embodiment of a two-dimensional absolute encoder in accordance with the present invention.
Figure 1A:
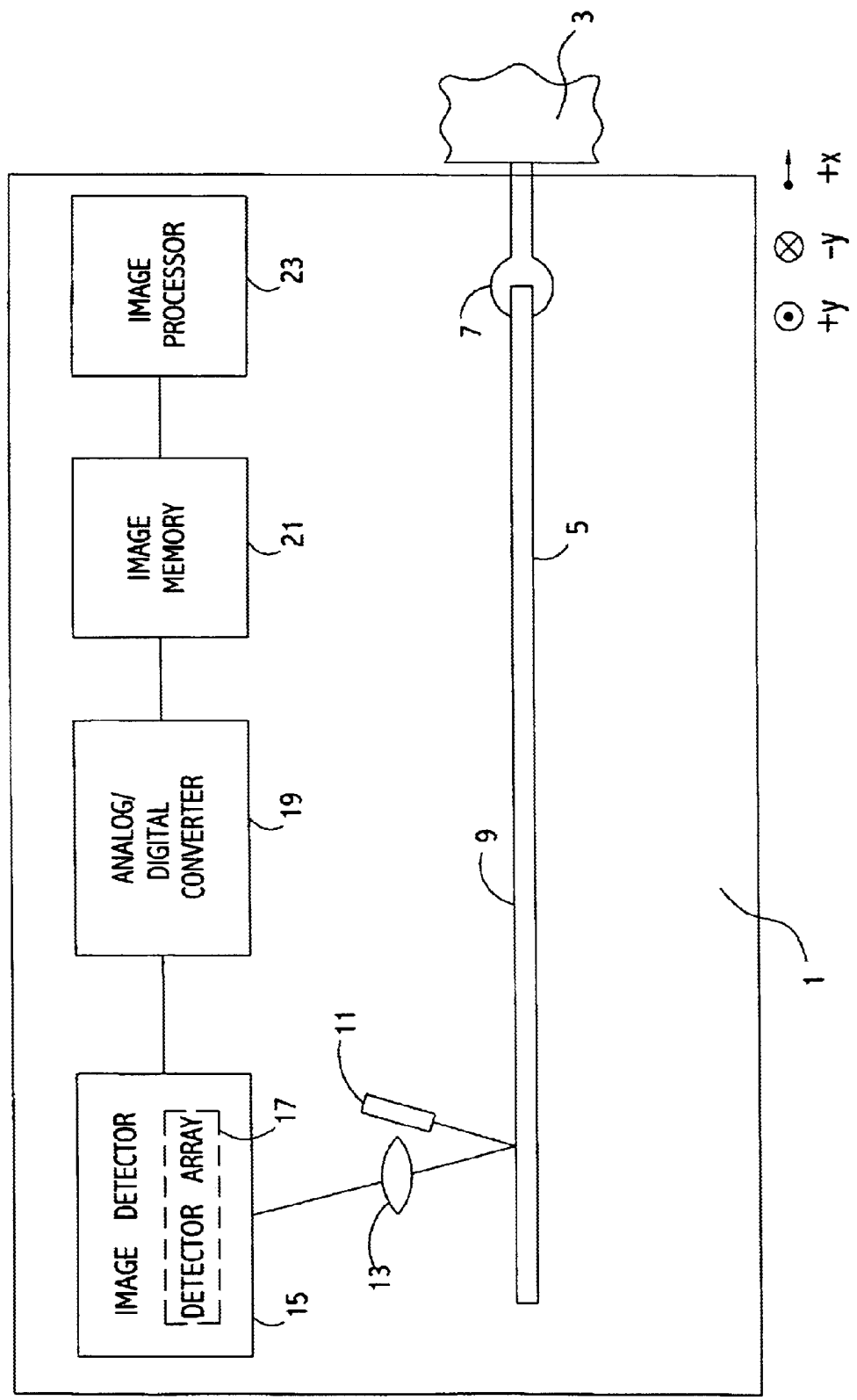

FIG. 1 shows a two-dimensional absolute encoder, in which encoder 1 determines the two-dimensional displacement of object 3, which moves in the X and Y directions. Encoder 1 includes scale 5, which is rigidly attached to object 3 by attachment 7 so that pattern 9 on scale 5, which will be described in detail below, is carefully aligned with the direction of motion of object 3. It is also possible to hold the scale fixed and to attach the light source and detector to the object to encode. Scale 5 is preferably made of glass or perforated mask, with transparent pattern 9 on an opaque background. Pattern 9 is preferably formed on top of scale 5. Light source 11, which outputs light, illuminates scale 5 from below. Other modes of illumination, such as edge illumination or reflected illumination for high contrast reflective patterns, can be used instead. Light transmitted through scale 5 is made incident on imaging arrangement 13, which forms an image of a portion of pattern 9 onto detector array 17 of image detector 15. Image formation can occur if illuminated scale is allowed to cast a shadow directly on detector array 17 in close proximity to scale 5. Imaging means can be a lens or lens system, a mirror or mirror system, lenses and mirrors in combination, or an arrangement of scale and detector in close proximity. If reflective patterns are used, the light source and the imaging arrangement will be on the same side of the scale as shown in FIG. 1-a. In image detector 15, detector array 17 detects the image of the scale as individual picture elements (pixels). Detector array 17 could be CCD array, CMOS array, or other photodetecter arrays. Signals corresponding to the individual pixels are output by detector array 17 to analog/digital converter 19, which digitizes the signals to produce digital data and outputs the digital data to image memory 21. Image processor 23 analyzes the digital data stored in image memory 21 to produce two-dimensional absolute translational information about object 3.

Figure 2:
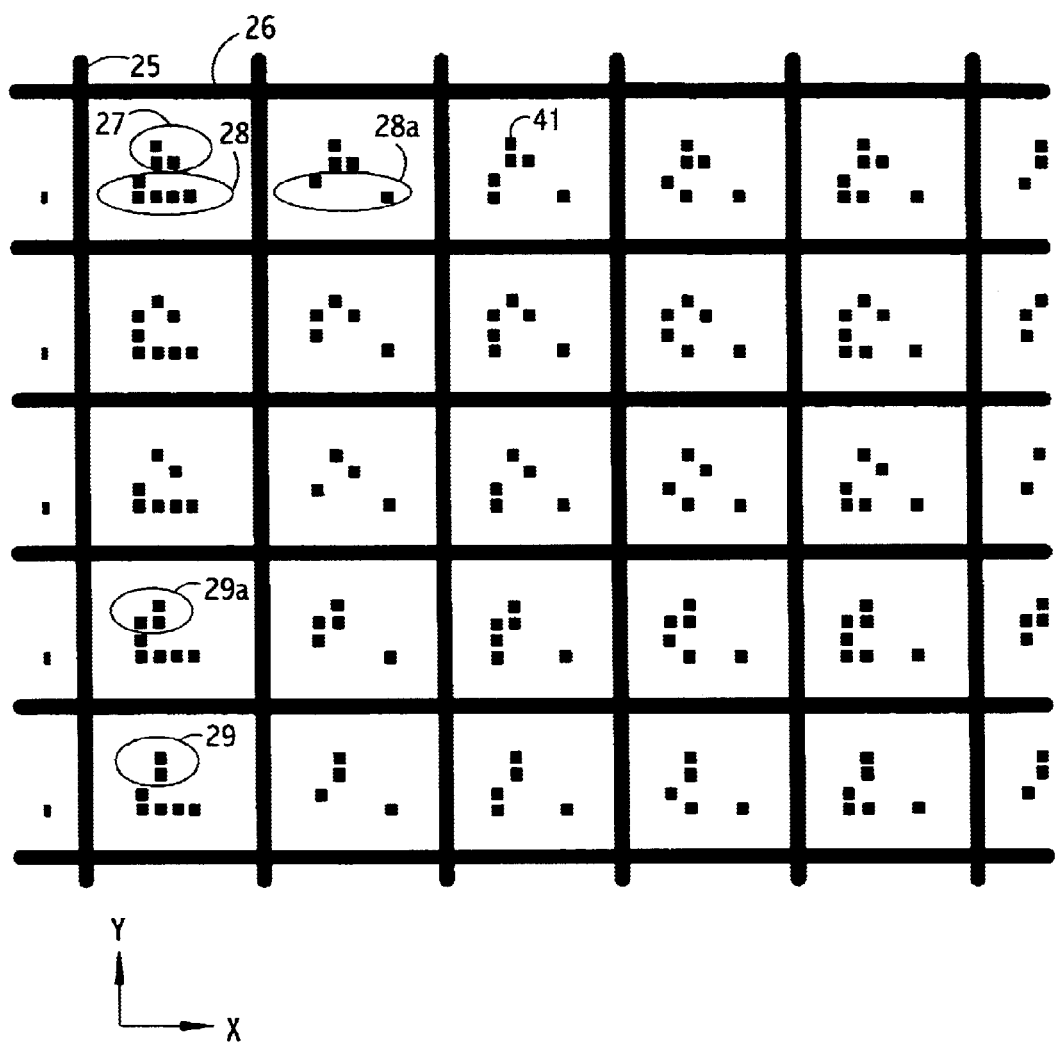
FIG. 2 shows one embodiment of a pattern of scale markings in the encoder of FIG. 1.

FIG. 2 shows images of pattern 9 formed on detector array 17 in accordance with the first preferred embodiment of the invention. As explained in U.S. Pat. No. 5,965,897, which is incorporated by reference, pattern 9 includes fiducials 25 for one direction and fiducials 26 for the other direction, both of which are orthogonal and periodically arranged with a known pitch, code bits 27 for one direction, and code bits 28 for the other direction.

The fiducials 25, 26 are identical across all encoded positions and are arranged in a manner which is strictly periodic in each direction of movement. In the present embodiment, each of the fiducials include bars 25, 26 aligned to be perpendicular to each direction of motion, although other forms can be used as needed. Each code area 27, 28 uniquely identify a corresponding one of fiducials 25,26, respectively. Code bits 41 in each code area 27, 28 form a binary code. Any binary code or arrangement of code bits which is convenient can be employed. In this embodiment, code patterns for both X and Y, which identify their vertical and horizontal gridlines 25, 26 respectively, are arranged in groups of 2 rows of the 5 columns of code bits, with trig the Y code group above the X code groups. The least significant bit of each group is at the lower left corner of the group while the most significant bit of the group is at the upper right corner. The first vertical gridline 25 on the left of this scale fragment 28 indicates a number 47, which is 00001 01111 in binary code, while the next one 28a to the right is a number 48, which is 00001 10000 in binary code and so on. Likewise, the lowest horizontal gridline 26 at the bottom of this scale fragment 29 indicates a number 66, which is 00010 00010 in binary code, and the one above 29a it is a number 67, which is 00010 00011 in binary code, and so on. These uniquely identifiable codings give the otherwise indistinguishable gridlines 25, 26 sufficient identity to encode absolute X-Y position.

The image reference on the detector array 17 is defined as a particular chosen detector pixel row for Y reference and detector pixel column for X reference in the image reference coordinate system associated with the field of view of the detector array 17. The X component of absolute position is equal to the known position of a vertical gridline 25 on the scale 5 plus the distance from the column centroid of that gridline 26 with respect to the image reference column. Likewise, the Y component of absolute position is equal to the known position of a horizontal gridline on the scale 5 plus the distance from the row centroid of that gridline 26 with respect to the image reference row.

Figure 3:
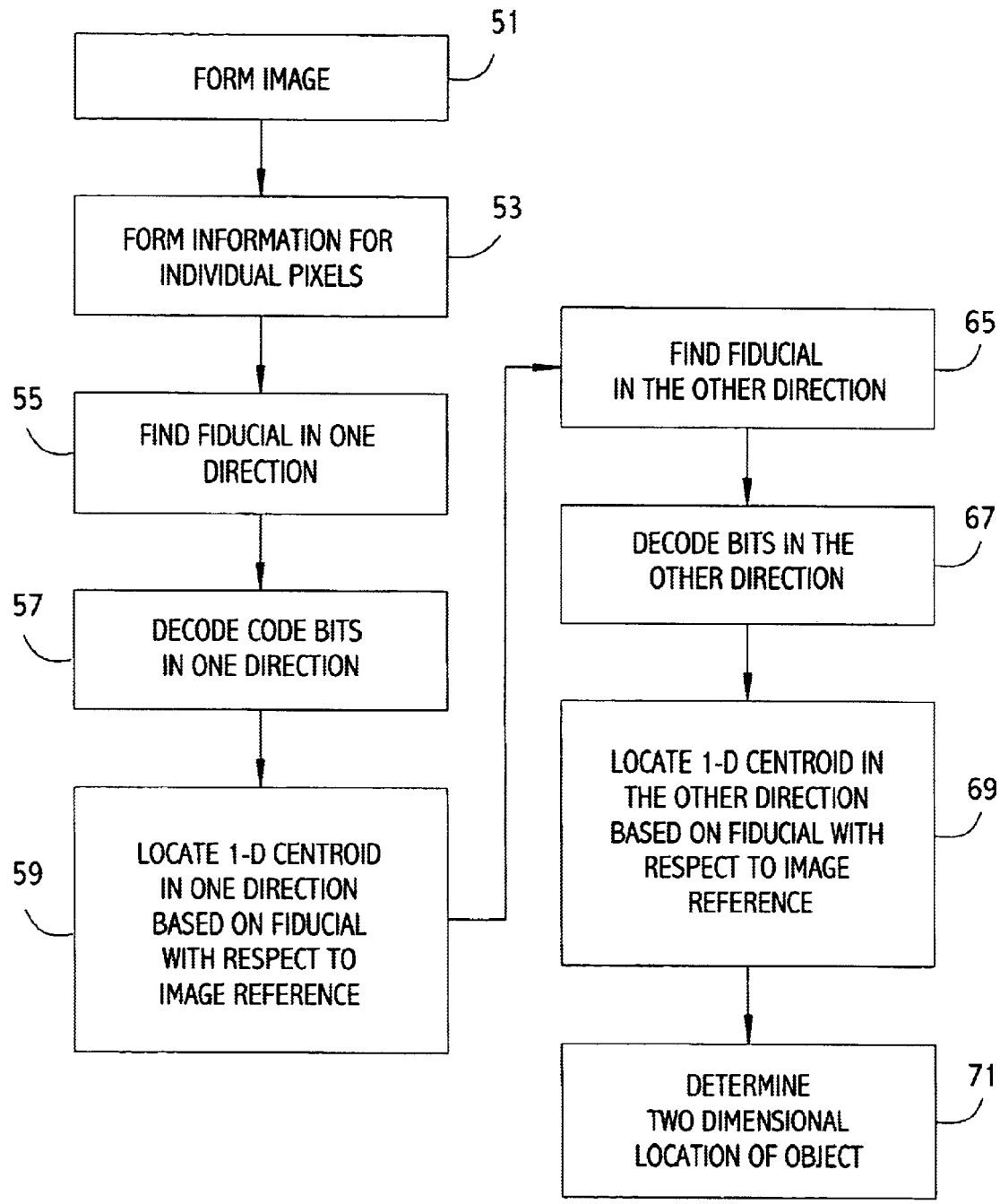
FIG. 3 shows a flowchart of a method of determining a two-dimensional absolute position of an object by using the encoder of FIG. 2.

The manner in which encoder 1 uses pattern 9 as shown in FIG. 2 to determine the two-dimensional absolute position of the object will now be explained with reference to the flow chart of FIG. 3. Once the image is formed on detector array 17 (step 51) and information is formed for individual pixels (step 53), analog/digital converter 19 digitizes the pixel information from detector array 17 and provides that information to memory 21. The physical locations of photodetector elements of detector array 17 are fixed references for a stationary coordinate frame. Image processor 23, which may be any appropriately programmed computer, derives the two-dimensional position information for the moving object in accordance with the relationship between the coordinate frame and the pixel locations: (1) identifying the image of at least one fiducial 25, 26 for one direction on the detector by finding the pattern of the fiducial 25, 26 itself (step 55) and by decoding the image of the pattern of code bits 27, 28 associated with only that fiducial 25, 26 (step 57); (2) establishing the positional relationship of that image to the image reference coordinate frame given simply by pixel array indices (step 59); (3) repeating (1) and (2) (steps 65 through 69) for the other direction; and (4) determining the two-dimensional location of the object based on the location of the fiducial in relation to the stationary coordinate frame and the value encoded in the code area in both directions (step 71).

The purpose of steps 59 and 69 is to determine the position of the image of the fiducial 25, 26 with respect to the pixel coordinate frame along the direction of motion and to thereby encode the motion. Any number of computational operations can be used to perform this function, including edge detection, peak detection, derivative, etc. However, a preferred embodiment of the encoding system computes the one-dimensional centroid of the fiducial 25, 26 in the direction of motion in the fixed: coordinate system.

Figure 4:
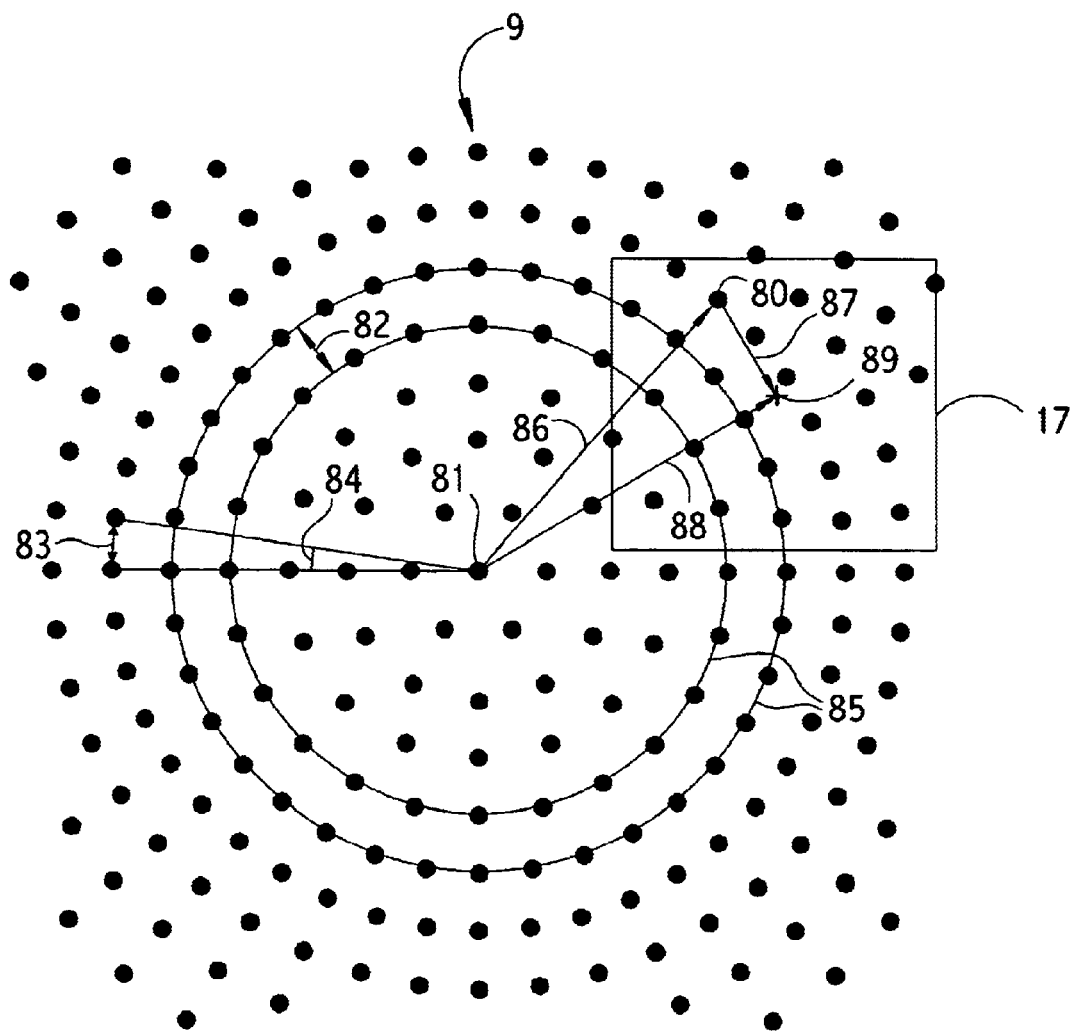
FIG. 4 shows one embodiment of a starfield pattern of scale markings in the encoder of FIG. 1.

FIG. 4 shows images of pattern 9 formed on detector array 17 in accordance with the second preferred embodiment of the invention. This pattern, referred to as a starfield pattern in two U.S. Pat. No. 5,960,381, comprises a plurality of image features 80 disposed on a plurality of concentric circles 85 and a pattern origin 81. Each of the plurality of image features 80 meet the following conditions:

1) Δradius 82 is uniform;
2) Δdistance 83 is the same for any two neighboring image features on one of the circles;
3) Δangle 84 is 2π/(number of the image features on one circle 85); and
4) Δradius 82 is significantly greater than Δdistance 83, wherein:

Δradius 82 is the incremental distance between the radius of one circle 85 and the radius of its neighboring circles (e.g. if Δradius=500, the pattern would have circles of radius 500, 1000, 1500, 2000, . . . );

Δdistance 83 is the incremental straight line distance between neighboring image features on a circle 85. This value is the same for any two neighboring image features on a circle 85, and approximately the same for every circle; and Δangle 84 is the incremental angular distance between neighboring image features 80 on a circle 85.

Figure 5:
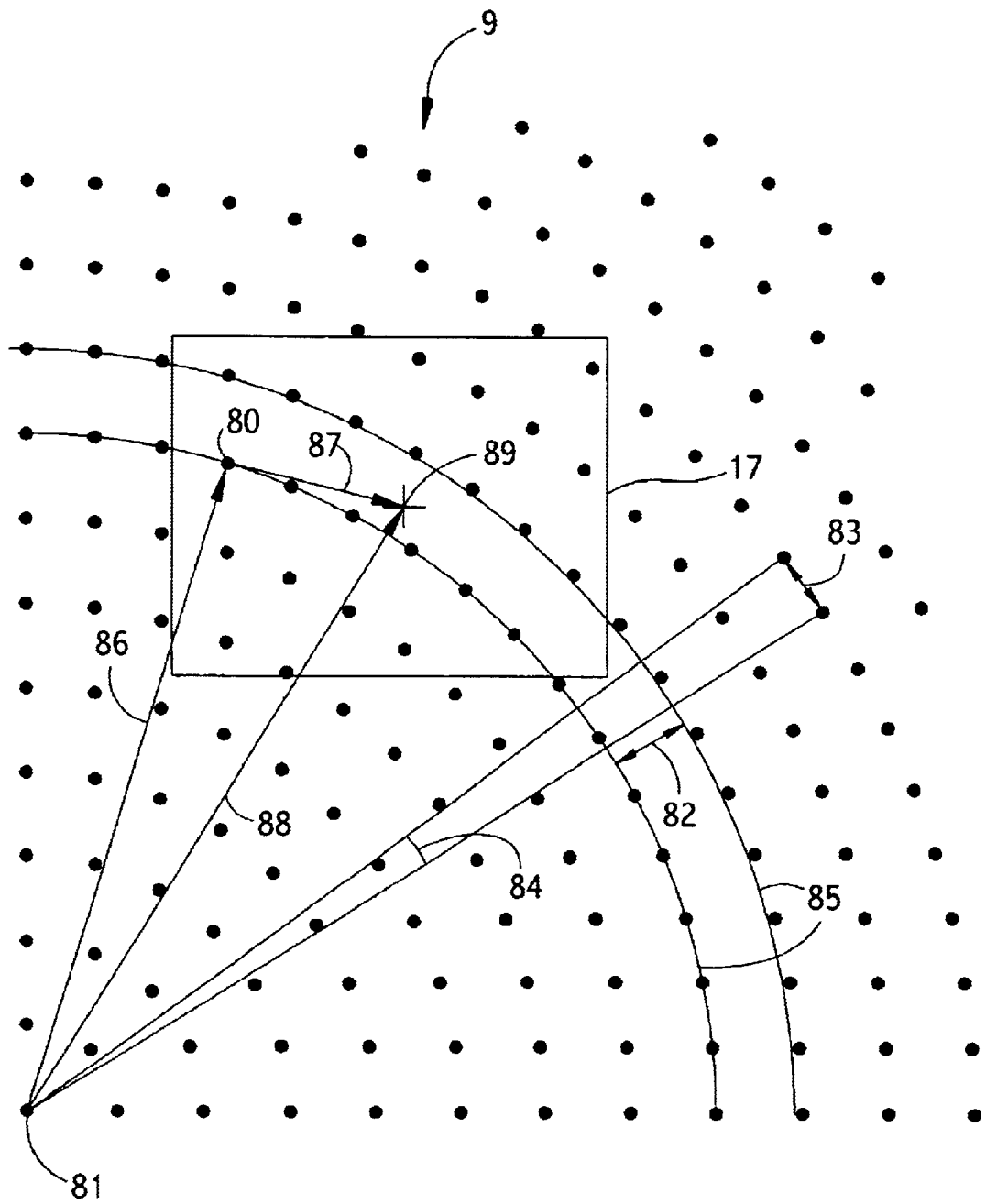
FIG. 5 shows another embodiment of a starfield pattern of scale markings in the encoder of FIG. 1.

FIG. 5 shows another embodiment of starfield pattern of scale markings in the encoder of FIG. 1. The embodiment utilizes the image features 80 within the first quadrant of the starfield pattern of FIG. 4.

Figure 6:
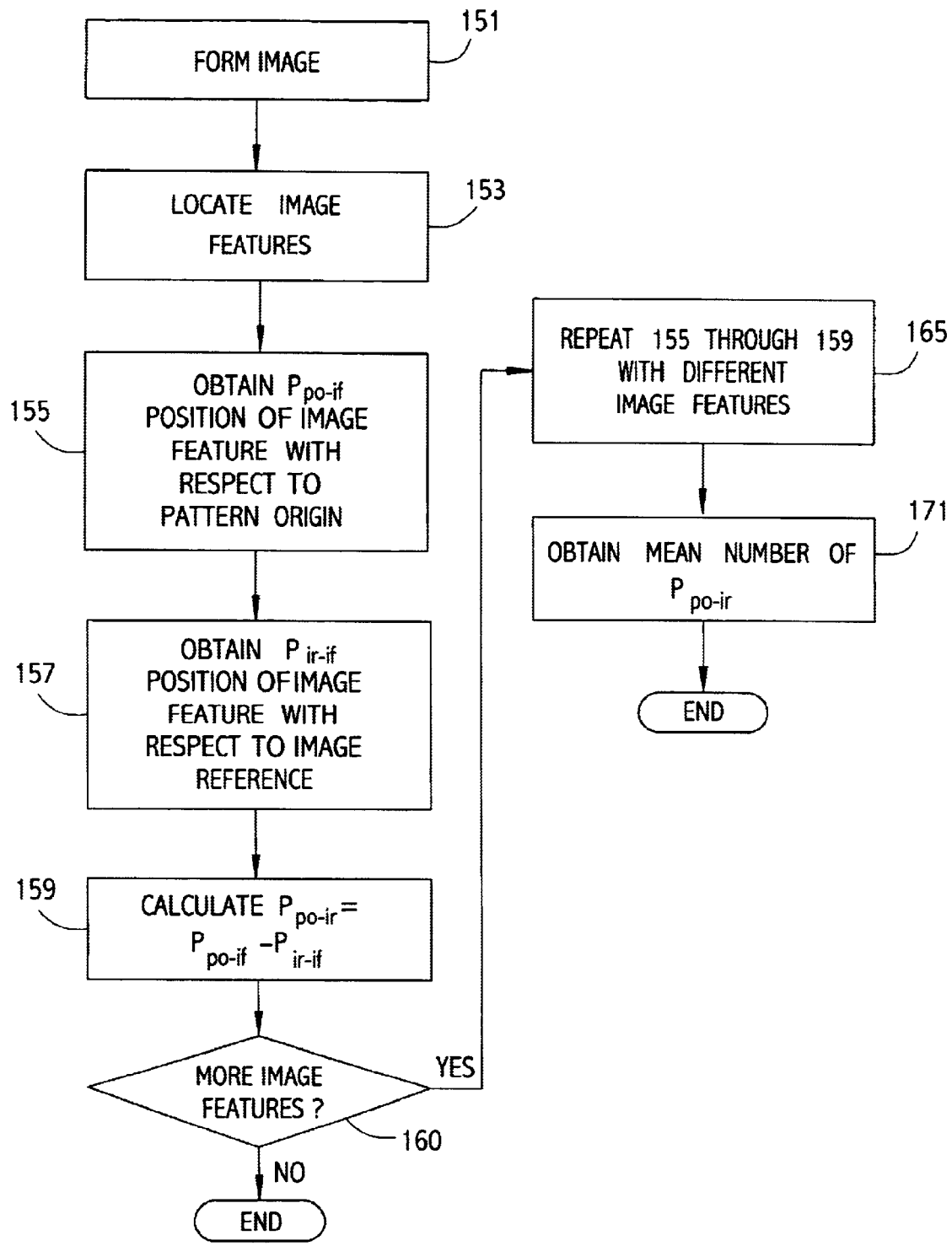
FIG. 6 shows a flow chart of a method of determining a two-dimensional absolute position of an object by using the encoder of FIGS. 4 and 5.

FIG. 6 shows the flow chart of the algorithm in which encoder 1 uses pattern 9 as shown in FIGS. 4 and 5 to determine the two-dimensional absolute position of the object.

First, the algorithm locates the plurality of image features 80 in the image recorded by the image detector 15 and stored in image memory 21. (Step 153) Using a centroiding process, the algorithm finds locations of image features 80 at sub-pixel resolution. Once the first image feature 80 has been found and if Δradius 82 is significantly greater than the Δdistance 83, the nearest two image features are the neighboring image features on the same circle. The remaining image features on the circle can be found by repeating this search from the newly found image feature until all image features on the circle have been located (i.e. the edge of the image has been reached in both directions). The image features on the remaining circles can be found by repeating this search procedure after moving towards or away from the pattern origin by Δradius 82. Conversely, if Δradius 82 is significantly less than the Δdistance 83, the nearest two image features are on neighboring circles. Other logic can be used to identity the image features based on such a pattern.

Second, the algorithm uniquely identifies each image feature in the image. Three or more image features on the same circle allow the construction of vectors pointing from each image feature to the pattern origin 81. The magnitude and direction of these vectors approximates an integer multiple of the Δradius 82 and Δangle 84 values, which allows each image feature to be uniquely identified.

Third, the algorithm determines position in XY two-dimensional. coordinates from the pattern origin 81 to an image reference 89 in the image. The image reference may be an image center of the image. Since every image feature in the image has been uniquely identified (step 153), each has a known distance from the go pattern origin by design (i.e. the image features 80 on the pattern are placed at precise locations known to the designer). (step 155) Each image feature in the image is also of known distance from the image reference 89 based on the calculated centroid value. (step 157) Therefore, absolute position of the object denoted by $P_{po\text{-}ir}$ 88 can be obtained by vector addition of a vector $\vec{p_{po\text{-}if}}$ 86 from pattern origin 81 to one image feature 80 and a vector $\vec{p_{if\text{-}ir}}$ 87 from the image feature 80 to the image reference 89 as the following (step 159):

$$\vec{p_{po\text{-}ir}} = \vec{p_{po\text{-}if}} - \vec{p_{ir\text{-}if}}$$

$$\vec{p_{po\text{-}if}} + \vec{p_{if\text{-}ir}}$$

wherein po refers to the pattern origin, if the image feature, and ir the image reference. The components of vector $\vec{p_{if\text{-}ir}}$ 87 for each image feature are calculated by image processing in accordance with the image. Because the location of the image reference pixel is known, the components of the vector can be calculated in real time as:

$X$ component of $\vec{p_{ir\text{-}if}} = x(\text{pixel})_{ir\text{-}if} * Xsf$ $Y$ component of $\vec{p_{ir\text{-}if}} = y(\text{pixel})_{ir\text{-}if} * Ysf$ wherein $x(\text{pixel})_{ir\text{-}if}$ is number of pixels in X direction between the image reference and the image feature;

$y(\text{pixel})_{ir\text{-}if}$ is number of pixels in Y direction between the image reference and the image feature;

Xsf is a scaling factor equal to the ratio of distance on the scale to the corresponding number of pixels in the image in the X direction due to the magnification of the imaging means; and Ysf is a scaling factor equal to the ratio of distance on the scale to the corresponding number of pixels in the image in the Y direction due to the magnification of the imaging means.

Finally, a number of position vectors derived from different image features as the above method are averaged to get the two-dimensional position.(step 165) That is, the two-dimensional position is calculated as the mean of the position vectors. (step 171) The position derived from this method is more accurate and statistically reliable than the position determination derived from one image feature alone according to the method in the preceding paragraphs, although one determination may be sufficient for a given application As those skilled in the art who have reviewed this specification will readily appreciate, an encoder according to the present claimed invention can be optimized by choices of components, opto-mechanical layout, and scale pattern details. There is an optimum scale feature pattern for a given geometric/CCD configuration which yields the most reliable outcome with the highest sensitivity and accuracy with respect to position. Besides the configurations of the scale pattern disclosed above, other scale patterns may be selected to satisfy the needs of specific equipment.

Because the modifications noted above and other modifications are possible within the scope of the present invention, the present invention should be construed as limited only by the appended claims.

What is claimed is:

1. A two-dimensional optical encoder for determining a two-dimensional absolute position of an object, the optical encoder comprising:

a scale having a pattern formed thereon, the pattern being predetermined to indicate an absolute location on the scale, wherein the pattern on said scale further comprises: a plurality of periods in two orthogonal directions, each of the plurality of periods in each direction including (a) a first portion which is identical for all of the plurality of periods and (b) a second portion which identifies said each of the plurality of periods;

means for relating motion between the scale and the object;

means for illuminating the scale;

means for forming an image of the pattern; and means for detecting and outputting signals derived from the portion of the image of the pattern which lies within a field of view of the detector means; and analyzing means, receiving the signals from the detector means, for determining a two-dimensional absolute location on the scale in accordance with the image.

2. An optical encoder as in claim 1, wherein:
the first portion of said each of the plurality of periods comprises at least one bar-shaped mark; and
the first portion of said each of the plurality of periods in one direction is perpendicular to the first portion of said each of the plurality of periods in the other direction.

3. An optical encoder as in claim 2, wherein the second portion of said each of the plurality of periods in two orthogonal directions comprises a plurality of markings which provide a binary encoding of a number identifying said each of the plurality of periods.

4. The optical encoder as in claim 1, wherein the step of determining an absolute location on the scale further comprises:
(i) determining a location of the first portion of the one of the plurality of periods within the image reference coordinate system defined by detector means;
(ii) decoding the second portion of the one of the plurality of periods to derive an identity of the one of the plurality of periods;
(iii) determining the absolute location in one direction of the object in accordance with the location of the first portion determined in operation (i) and the identity determined in operation (ii); and
(iv) repeating (i) through (iii) for the other direction.

5. The optical encoder as in claim 1, wherein the detecting means comprises an array of photodetector elements.

6. The optical encoder as in claims 5, wherein the detecting means comprises a charge-coupled device (CCD) array which comprises the array of photodetector elements.

7. The optical encoder as in claim 5, wherein the detecting means comprises a CMOS array which comprises the array of photodetector elements.

8. The optical encoder as in claim 5, wherein the detecting means comprises a charge-injection device (CID) array which comprises the array of photodetector elements.

9. The optical encoder as in claim 1, wherein the analyzing means comprises an analog/digital converter for converting the signals into digital data.

10. The optical encoder as in claim 9, wherein the analyzing means further comprises an image memory for storing the digital data.

11. The optical encoder as in claim 10, wherein the analyzing means further comprises an image processor for determining an absolute location on the scale in accordance with the digital data.

12. The optical encoder as in claim 1, wherein:
the pattern comprises transparent markings on an opaque background; and
the means for illuminating and means for receiving are on opposite sides of the scale, so that the light is transmitted through the transparent markings.

13. The optical encoder as in claim 1, wherein:
the pattern comprises reflective markings on an opaque background; and
the means for illuminating and means for receiving are on the same sides of the scale, so that the light is reflected from the markings towards the imaging.

14. A two-dimensional optical encoder for determining a two-dimensional absolute position of an object, the optical encoder comprising:
a scale having a pattern formed thereon, the pattern being predetermined to indicate an absolute location on the scale, wherein the pattern on said scale further comprises:
a plurality of image features disposed on a plurality of concentric circles and a pattern origin, each of the image features meeting the following conditions:
1) Δradius is uniform wherein Δradius is the incremental distance between the radius of one of the circles and the radius of neighboring circles thereof;
2) Δdistance is the same for any two neighboring image features on one of the circles wherein Δdistance is the incremental straight line distance between any two neighboring image features on one of the circles; and
3) Δangle is 2π/(number of the image features on one circle) wherein Δangle is the incremental angular distance between neighboring image features on one of the circles;
means for relating motion between the scale and the object;
means for illuminating the scale;
means for forming an image of the pattern; and
means for detecting and outputting signals derived from the portion of the image of the pattern which lies within a field of view of the detector means; and
analyzing means, receiving the signals from the detector means, for determining a two-dimensional absolute location on the scale in accordance with the image.

15. The optical encoder as in claim 14, wherein the step of determining an absolute location on the scale further comprises:
(i) identifying said image features which lie within a field of view;
(ii) obtaining a position of one of said image features within the field of view, said position being in two-dimensional coordinate with respect to said pattern origin;
(iii) obtaining a position of one of said image features within the field of view, said position being in two-dimensional coordinates with respect to said image reference; and
(iv) subtracting the value obtained from (iii) from the value obtained from (ii) to obtain a position value of the object.

16. A method of determining a two-dimensional absolute position of an object, the method comprising:
(a) providing a scale having a pattern formed thereon, the pattern being predetermined to indicate a two-dimensional absolute location on the scale, wherein the pattern on said scale further comprises a plurality of periods in two orthogonal directions, each of the plurality of periods in each direction including (a) a first portion which is identical for all of the plurality of periods and (b) a second portion which identifies said each of the plurality of periods;
(b) relating motion between the scale and the object;
(c) forming an image of the pattern which lies within a field of view, the field of view defining a fixed coordinate system; and
(d) determining a two-dimensional absolute location on the scale in accordance with the image.

17. The method as in claim 16, wherein the step of determining a two-dimensional absolute location comprises:
(i) determining, in accordance with the image, a location of the first portion of the one of the plurality of periods within the fixed coordinate system;
(ii) decoding, in accordance with the image, the second portion of the one of the plurality of periods to derive an identity of the one of the plurality of periods;

(iii) determining the absolute location of the object in one direction in accordance with the location of the first portion determined in step (i) and the identity determined in step (ii); and (iv) repeating step (i) through (iii) in the other direction.

18. The method as in claim 17, wherein the step of determining a two-dimensional absolute location further comprises:

repeating (i) through (iv) with different periods within the field of view; and averaging the position values for the absolute location of the object derived for each direction from all periods found within the field of view.

19. A method of determining a two-dimensional absolute position of an object, the method comprising:

(a) providing a scale having a pattern formed thereon, the pattern being predetermined to indicate a two-dimensional absolute location on the scale, wherein the pattern on said scale further comprises:

a plurality of image features disposed on a plurality of concentric circles and a pattern origin, each of the plurality of image features meeting the following conditions:

1) Δradius is uniform wherein Δradius is the incremental distance between the radius of one of the circles and the radius of neighboring circles thereof;

2) Δdistance is the same for any two neighboring periods on one of the circles wherein Δdistance is the incremental straight line distance between any two neighboring periods on one of the circles; and 3) Δangle is 2π/(number of the periods on one circle) wherein Δangle is the incremental angular distance between neighboring periods on one of the circles;

(b) relating motion between the scale and the object;

(c) forming an image of the pattern which lies within a field of view, the field of view defining a fixed coordinate system; and (d) determining a two-dimensional absolute location on the scale in accordance with the image.

20. The method as in claim 19, wherein the step of determining a two-dimensional absolute location comprises (i) identifying said image features which lie within a field of view;

(ii) obtaining position of one of said image features within the field of view, said position being in two-dimensional coordinates with respect to said pattern origin;

(iii) obtaining position of one of said image features within the field of view, said position being in two-dimensional coordinates with respect to said image reference; and (iv) subtracting the value obtained from (ii) from the value obtained from (i) to obtain a position value of the object.

21. The method as in claim 20, wherein the step of determining a two-dimensional absolute location further comprises:

repeating (ii) through (iv) with different image features; and averaging the position values of the object.

22. The method as in claim 20, wherein the step of obtaining the position of said image feature with respect to the pattern origin comprising:

retrieving the position from a database.

23. The method as in claim 20, wherein the step of obtaining the position of said image feature with respect to the pattern origin comprising:

calculating the position in real time.

24. The method as in claim 19, wherein the image reference is the image center.

25. The method as in claim 19, wherein the conditions for each of the plurality of image features further comprises:

Δradius is significantly greater than Δdistance.

26. The method as in claim 25, wherein the step of identifying said image features further comprises:

(i) locating an image feature;

(ii) searching for the nearest image feature;

(iii) repeating (ii) until all image features on the same circle are found;

(iv) locating an image feature on a neighboring circle;

(v) searching for the nearest image feature;

(vi) repeating (ii) until all image features on the same circle are found; and (vii) repeating (iv) through (vi) until all the image features within the field of view are found.

* * * * *